(12) United States Patent
Artis

(10) Patent No.: US 6,859,167 B2
(45) Date of Patent: Feb. 22, 2005

(54) METHOD FOR INCREASING THE UNAMBIGUOUS DISTANCE IN FSK RADARS

(75) Inventor: Jean-Paul Artis, Plouzane (FR)

(73) Assignee: Thales, Neuilly sur Seine (FR)

( * ) Notice: Subject to any disclaimer, the term of this patent is extended or adjusted under 35 U.S.C. 154(b) by 0 days.

(21) Appl. No.: 10/657,708

(22) Filed: Sep. 9, 2003

(65) Prior Publication Data
US 2005/0017892 A1 Jan. 27, 2005

(30) Foreign Application Priority Data
Sep. 10, 2002 (FR) .......................... 02 11391

(51) Int. Cl.$^7$ .............................. G01S 7/282
(52) U.S. Cl. ...................... 342/128; 342/129; 342/200
(58) Field of Search ................. 342/70, 109, 112, 342/115, 118, 127, 128, 129, 134, 135, 137, 160, 162, 189, 200, 202, 204

(56) References Cited

U.S. PATENT DOCUMENTS

| | | | |
|---|---|---|---|
| 4,379,295 A | | 4/1983 | Lewis et al. ............... 342/201 |
| 4,384,291 A | | 5/1983 | Lewis et al. ............... 342/196 |
| 4,443,799 A | | 4/1984 | Rubin ........................ 342/201 |
| 4,727,376 A | * | 2/1988 | Prenat ....................... 342/134 |
| 5,442,359 A | * | 8/1995 | Rubin ........................ 342/109 |
| 5,583,512 A | * | 12/1996 | McEligot .................... 342/189 |
| 5,606,324 A | * | 2/1997 | Justice et al. ............... 342/62 |
| 6,184,820 B1 | * | 2/2001 | Kratzer ....................... 342/160 |
| 6,429,806 B1 | * | 8/2002 | Walmsley ................... 342/127 |

FOREIGN PATENT DOCUMENTS

| | | | |
|---|---|---|---|
| EP | 0849607 | 6/1998 | |
| EP | 0863408 | 9/1998 | |
| FR | 2844361 A1 * | 3/2004 | ........... G01S/13/93 |
| GB | 2172461 | 9/1986 | |
| GB | 2249448 | 5/1992 | |
| JP | 10282227 A * | 10/1998 | ........... G01S/13/26 |

OTHER PUBLICATIONS

"Pulse–diverse radar/sonar FSK–PSK waveform design to emphasize/de–emphasize designed Doppler–delay sectors", Wong, K.T.; Wing–Kit Chung; Radar Conference, 2000. The Record of the IEEE 2000 Int'l , May 7–12, 2000 Ps:745–749.*

"Matched FSK/PSK radar", Skinner, B.J.; Donohoe, J.P.; Ingels, F.M.;Radar Conference, 1994., Record of the 1994 IEEE National , Mar. 29–31, 1994 pp.:251–255.*

* cited by examiner

Primary Examiner—John B. Sotomayor
(74) Attorney, Agent, or Firm—Lowe Hauptman Gilman & Berner LLP.

(57) ABSTRACT

A method used to increase the ambiguity distance of FSK radars implements a waveform made up of patterns consisting of frequency plateaux whose frequencies are alternately shifted by plus or minus a value $\Delta f'$. With this waveform, the method associates processing operations to eliminate ambiguous echoes and image signals. This method has the advantage of not modifying the repetition period of the radar to which it is applied. The method according to the invention can be applied especially to radars in automobiles and especially to anti-collision radars.

8 Claims, 9 Drawing Sheets

METHOD FOR INCREASING THE UNAMBIGUOUS DISTANCE IN FSK RADARS

BACKGROUND OF THE INVENTION

The principle of transmission in FSK radars is known. As can be seen in FIG. 1, it consists in sending a repetitive pattern constituted by a wave that is frequency-modulated in plateaux or steps.

Furthermore, if T is the repetition period of the pattern, the ambiguous distance D is defined in a known way, by the formula:

$$D = \frac{C \cdot T}{2} \quad (1)$$

The link budget of the radar is generally sized in such a way that, for the majority of the types of targets encountered, the power of the signal backscattered by targets located beyond the ambiguity distance is below the detection threshold of the radar. However, in certain particular circumstances, the signal backscattered by targets located beyond this distance is above the detection threshold. This is the case for example when the radar directed at a specifically chosen angle. Echoes with erroneous positions are then obtained at output of the radar receiver, and need to be eliminated.

To limit these undesirable echoes, it becomes necessary to increase the ambiguity distance of the radar by increasing the period T of repetition of the pattern sent. Increasing T amounts especially to increasing the number of stages or again to lengthening their duration.

This approach however is not always applicable because the sizing of the various parameters of the radar is generally the result of a compromise on the waveform emitted. This leads for example to limiting the number of plateaux or again their duration.

SUMMARY OF THE INVENTION

It is an aim of the present invention especially to resolve the problem raised by the need to increase the ambiguity distance without however lengthening the period T. To this end, an object of the invention is a method for the generation of the waveform advantageously used to double the ambiguity distance of an FSK radar without doubling the duration T of the pattern sent.

This method has the advantage of generating a wave very close to the waveform initially determined to optimize the working of the radar.

Advantageously, it is particularly adapted to automobile radars for which the wave propagation time corresponding to the instrumented range of the radar is small when compared with the duration of the frequency plateaux forming the pattern.

BRIEF DESCRIPTION OF THE DRAWINGS

Other features and advantages shall appear from the following description. The description is made with reference to the appended figures, of which.

MORE DETAILED DESCRIPTION

Figure 1:
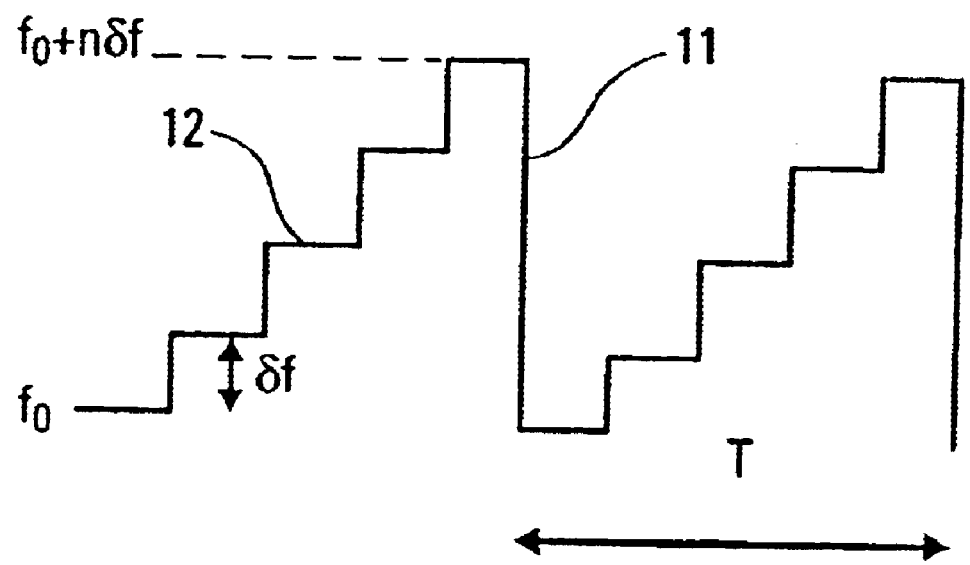
FIG. 1 is a graph showing an exemplary waveform transmitted by an FSK radar.

FIG. 1 is a graph representing a standard FSK waveform.

It can be seen that the transmitted wave takes the form of a repetition of patterns 11 with a duration T, whose frequency varies from $f_0$ to $f_0+n.\delta f$ in n frequency plateaux 12 of equal duration for example.

As stated here above, the ambiguity distance in this case is equal to $$\frac{C \cdot T}{2}.$$

Thus, for example, an FSK radar transmitting at a period T of 12 µs will have an ambiguous detection distance of 1.8 Km.

Figure 2:
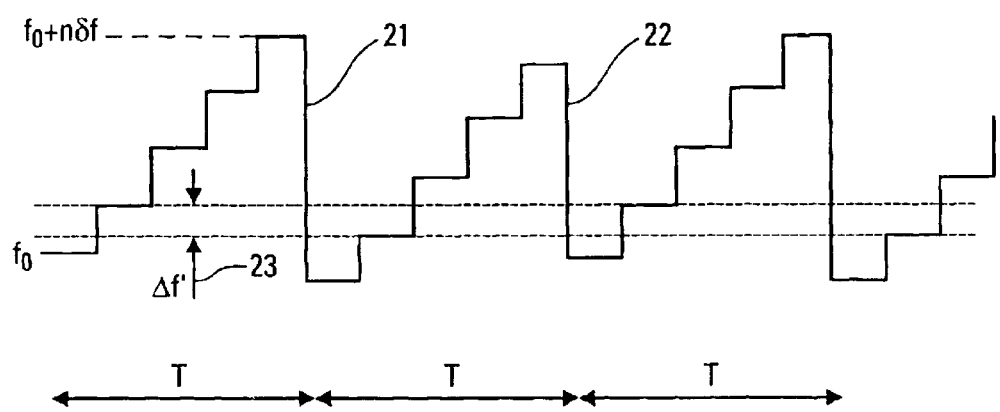
FIG. 2 is a graph showing a waveform implemented by the method according to the invention.

FIG. 2 is a graph representing the waveform implemented by the method according to the invention.

It can be seen that, as in the case of FIG. 1, the wave that is sent takes the form of a sequence of patterns. However, in the case of the invention, the sequence is a double sequence. Indeed, one pattern 21 in every two patterns is a duration pattern T whose frequency varies from $f_0$ to $f_0+n.\delta f$ in n plateaux, while the next pattern 22 is a one whose frequency varies for example from $(f_0-\Delta f)$ to $(f_0-\Delta f)+n.\delta f$. Thus the complex pattern is formed with a periodicity of 2.T by shifting one pattern with respect to the next pattern alternately by $+\Delta f$ and then by $-\Delta f$.

The frequency shift $\Delta f$ 23 is advantageously chosen so that it is large enough to induce a phase rotation, on the echo of a target located beyond the ambiguity distance, that can be detected as such and can be eliminated by the signal processing means with which the radar is equipped. At the same time, this difference is chosen to be low enough not to substantially modify the characteristics of detection of the echoes coming from targets that are unambiguous in distance, and especially not to modify their level.

By way of an example, we may consider a waveform comprising patterns with a duration T=12 µs, consisting of five levels evenly spaced out by about 160 KHz with a frequency difference $\Delta f$ of about 100 KHz.

The use of such a waveform especially has the advantage of doubling the ambiguity distance in considering the double periodicity created by the alternation of the patterns with $f_0$ and with $f_0+\Delta f$. Thus, at its reception by the radar, a distant echo will be demodulated with the frequency of the current pattern, shifted by $\Delta f$ relative to its own frequency. This difference will be expressed, at the received signal, by a phase shift making it possible to identify this signal as coming from an echo that is ambiguous in distance and to eliminate it from the processing.

Figure 3:
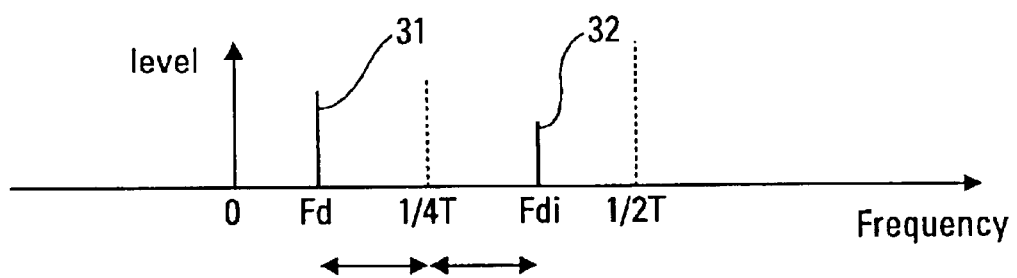
FIG. 3 illustrates the spectral representation of an echo corresponding to the waveform according to the invention, backscattered by a target.

The representation of FIG. 3 shows the effects induced on the spectrum of an echo of unambiguous distance, coming from a target illuminated by the waveform according to the invention.

It can be seen that, in addition to the characteristic line of the echo which is located at the Doppler frequency $F_d$ 31, there is an intermodulation line 32 with a frequency $f_{di}$. The frequency $f_{di}$ is located within the frequency domains ranging from 0 to $$\frac{1}{2T}$$

corresponding to the domain of the unambiguous Doppler frequencies.

Besides, computations show which is the frequency symmetrical to the frequency $F_d$ in relation to $$\frac{1}{4T}.$$

We have:

$$f_{di} = \frac{1}{2T} - f_d \qquad (2)$$

Thus, the value of $F_{di}$ is perfectly known.

Figure 4:
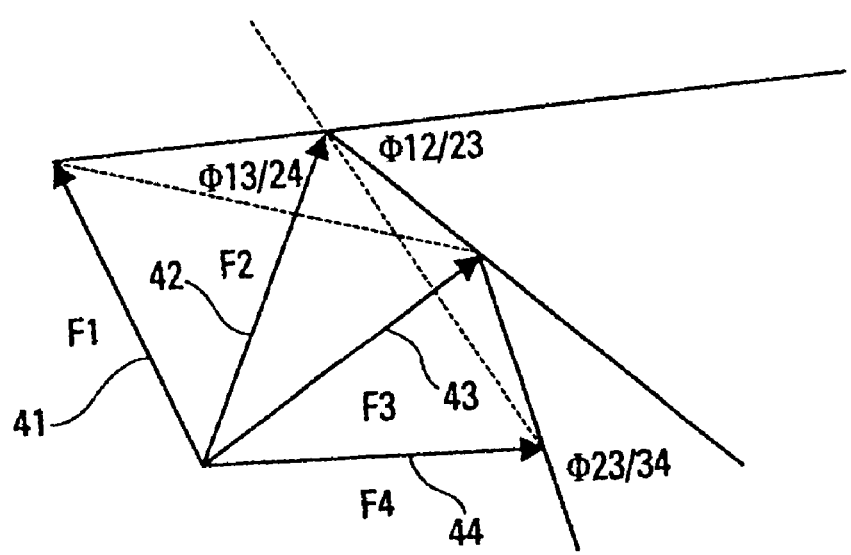
FIG. 4 is a vector view of the received signal.

The use of a waveform according to the invention, as described in FIG. 2, makes it possible to extend the ambiguity distance and to determine, as a function of the value of the phase of the received signal, whether a received echo is really seen at the right distance. To remove the ambiguity, several types of processing can be envisaged. These types of processing are known and shall not be described herein. FIG. 4 illustrates a possible exemplary processing that can be used to remove the distance ambiguity of an echo received in the case of an FSK transmission. This method is described especially in the French patent application No. 96 15740.

FIG. 4 is a vector representation, after Doppler analysis, of the signal received for four frequencies corresponding to four of the n frequency plateaux forming a pattern. In the figure, the vectors $F_1$ 41 to $F_4$ 44 thus correspond to the vector representations of the signals resulting from the analysis of the samples coming from the corresponding frequency plateaux.

To know if the received signal shows any distance ambiguity, it is possible, in the case of an FSK wave, to apply usual FSK distance estimation operators for example to the vectors $F_1$ to $F_4$. Should the transmission be done in equidistant plateaux of frequency $\delta f$, these operators may be expressed especially as follows:

$$D12/23 = (C/4\pi\delta f) \cdot \phi[(F2-F1),(F3-F2)] = C/4\pi\delta f) \cdot \phi12/23 \qquad (3)$$

$$D13/24 = (C/4\pi\delta f) \cdot \phi[(F3-F1),(F4-F2)] = C/4\pi\delta f) \cdot \phi13/24 \qquad (4)$$

$$D23/34 = (C/4\pi\delta f) \cdot \phi[(F3-F2),(F4-F3)] = C/4\pi\delta f) \phi23/34 \qquad (5)$$

where $\phi12/23$, $\phi13/24$ and $\phi23/34$ represent the phase rotations corresponding to the shifting of the target.

For a target located in the field of validity of the measurements made, especially with respect to the duration of the propagation time relative to that of the frequency levels of the pattern, these operators make it possible to determine the distance of the target. The principle of this determination is explained especially in the French patent No. 96 15740.

To then determine whether the target is ambiguous or not, it is possible, for example, to apply the following criterion of validity to the computed values D12/23, D13/24 and D23/34:

$$D12/23 \text{ and } D13/24 \text{ and } D23/34 < D0 \qquad (6)$$

$$(D12/23 - D23/34) \text{ and } (D13/24 - D23/34) \text{ and } (D12/23 - D13/24) < D1 \qquad (7)$$

where the distances $D_0$ and $D_1$ are chosen as a function of the desired detection capacities.

As mentioned especially in the French patent 97 02547, this criterion of validity makes it possible especially to obtain a reduction of the noise levels in the signal following the computations of differences between channels.

The type of processing of distance ambiguity presented here above by way of an example can be applied to all signals obtained by FSK transmission. In particular, it can be applied advantageously to the waveform according to the invention.

Figure 5A:
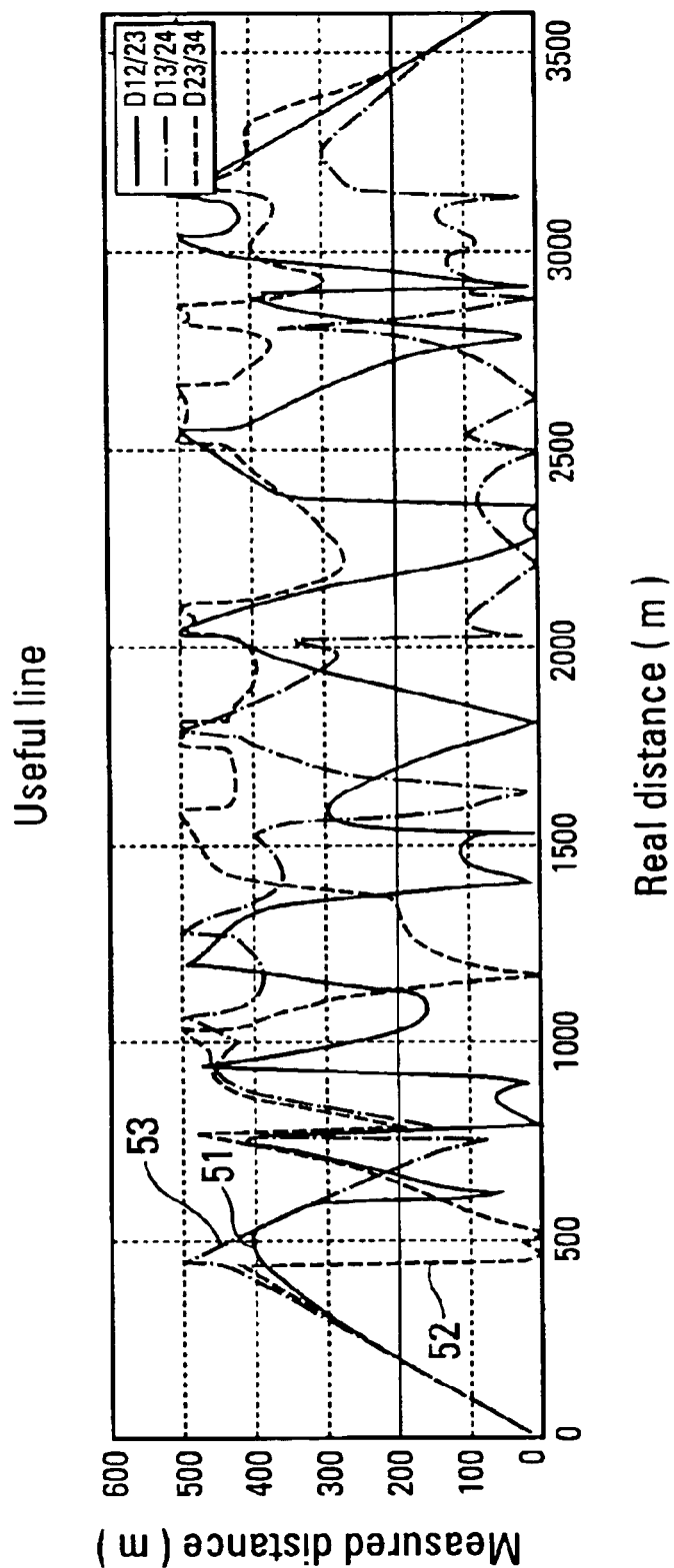
FIG. 5a uses an exemplary simulation to illustrate a possible processing of distance ambiguity on the received signal and shows curves with a variation of the distance measured by the different FSK operators.
Figure 5B:
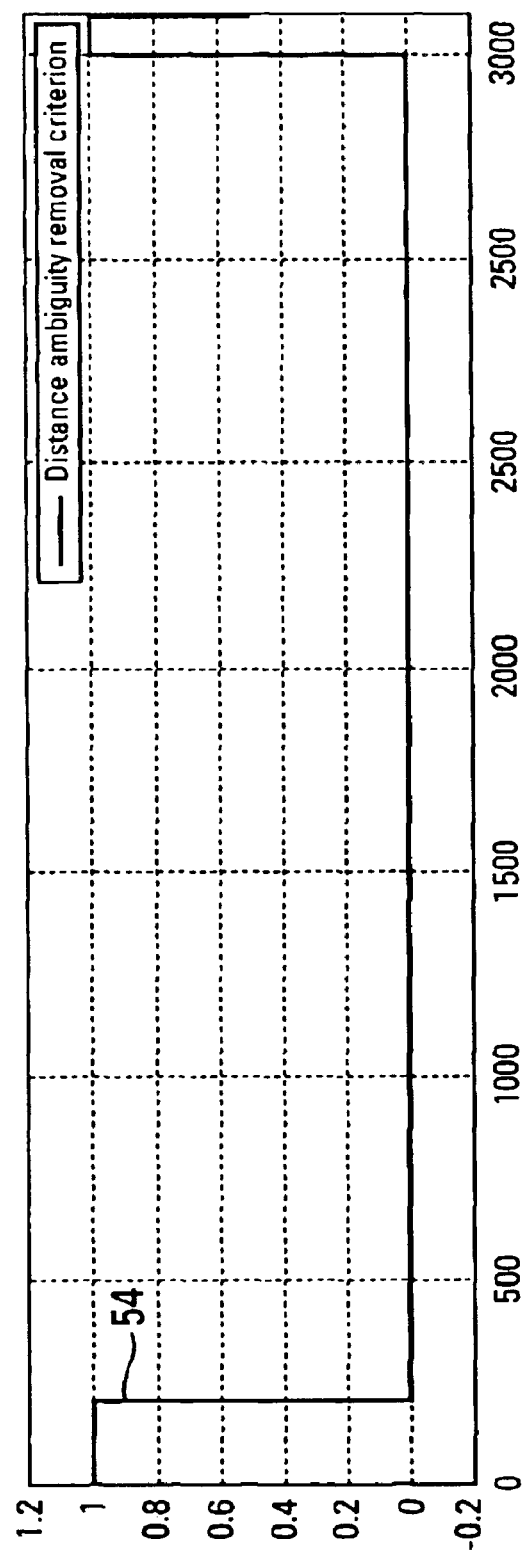
FIG. 5b shows a curve doubling the ambiguity distance.

Through the graphs 5a and 5b, FIG. 5 provides an illustration, through an exemplary simulation, of the application of distance ambiguity processing as described here above to the signal received on a range of 3.5 Km. This example takes a value $D_0=200$ m, $D_1=30$ m and a waveform according to the invention, for which $\Delta f=75$ KHz.

The graph 5a shows curves 51, 52 and 53 of variation of the distance measured by the different FSK distance operators D12/23 and D13/24 and D23/34, as a function of the real distance of the echo received by the radar.

It is observed that, for distances ranging from 0 m to about 500 m, the three operators give an identical measured distance. Then, beyond 500 m and up to about 3500 m, it is no longer possible to obtain an identity of the three values. The criterion of validity will therefore enable the elimination, by processing, of any echo whose real distance is greater than 200 m and smaller than 3500 m. This is expressed by the graph 5b which shows the curve 54 corresponding to the value of validity given, as a function of the real distance of the echo received, to the measured value. It is observed that, between 0 and 200 m, the criterion of validity causes the value 1 to be assigned to the unambiguity of the distance measured while, beyond this distance and up to 3500 m, it is assigned the value 0. Beyond 3500 m on the contrary, it again becomes impossible to remove the ambiguity by means of this criterion.

In FIG. 5, it can be advantageously seen that the validity of the FSK distance operators is not affected by the use of a waveform according to the invention. Furthermore, it can also be seen that the use of a waveform according to the invention really makes it possible to almost double the ambiguity distance which, with a classic FSK waveform, would have been 1800 m.

The illustration of FIG. 5 therefore shows that, by using the waveform described here above and standard distance ambiguity removal techniques used to process the signals coming from an FSK wave, the method of the invention advantageously doubles the ambiguity distance. It achieves this result without changing the pattern repetition period T and, therefore, without changing the desired detection parameters.

Figure 6:
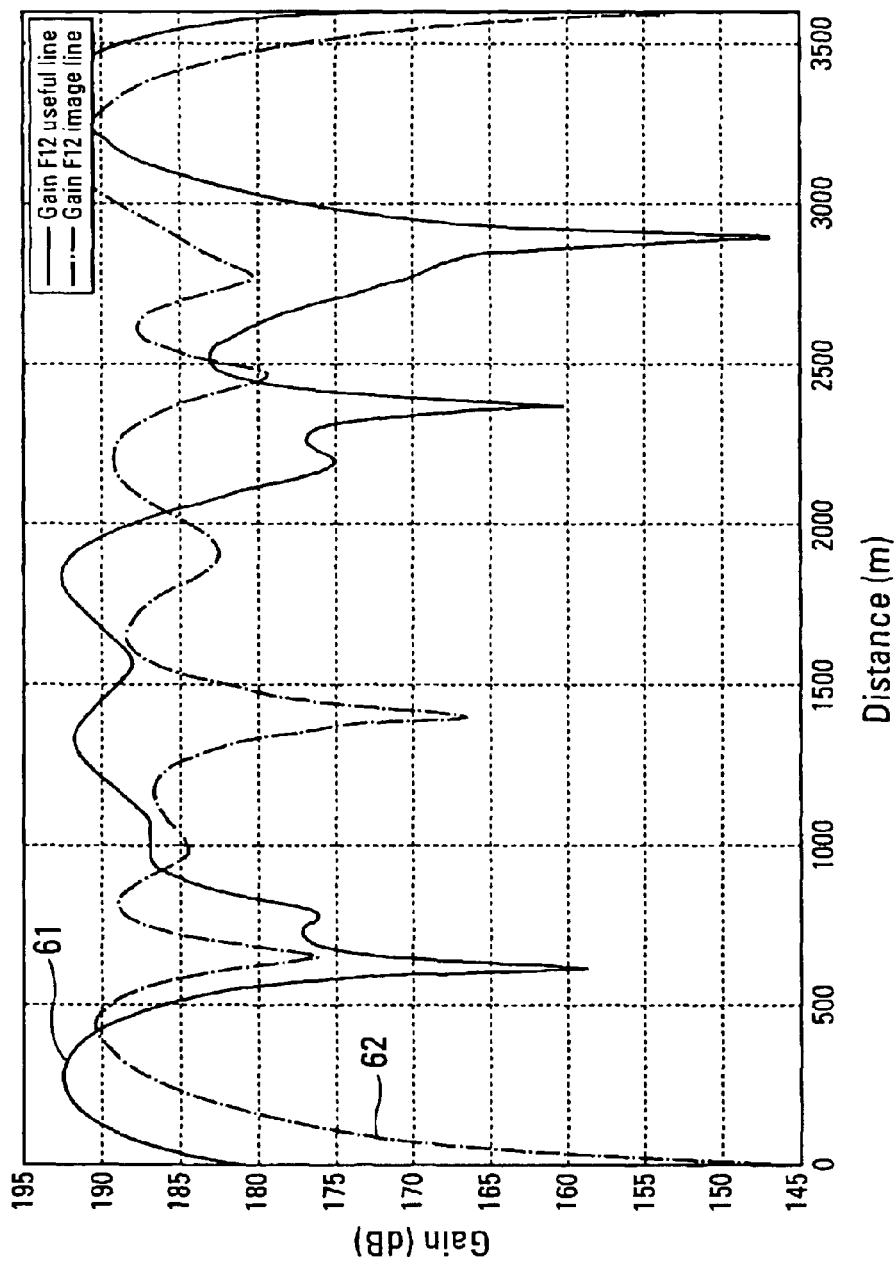
FIG. 6 is a graph representing the distance of the echo, the gain obtained on the useful line and the gain obtained on the image line.

The graph of FIG. 6 shows the curves 61 and 62 which, for a given distance and for the example taken in FIG. 5, respectively show the processing gains obtained on the real signal received (useful line) and on the signal coming from the frequency difference Δf' between two consecutive patterns of the waveform according to the invention (image line). This figure shows that, for a distance of less than about 500 m, the gain on the useful line is constantly greater than the gain on the image line whereas, subsequently, it could be the contrary. This observation can be profitably used to systematically determine whether the analyzed signal is a real unambiguous echo or else the image signal that is attached to it. To do this, one approach consists for example in identifying the signals coming from unambiguous echoes whose Doppler frequencies form pairs ($F_d$, $F_{di}$) and in comparing the difference between gains obtained on each of the signals with a value used as a criterion. The principle then is for example, the following:

- A line situated at the frequency $F_u$ is chosen and the corresponding gain $G_u$ is read.
- The line supposed to be the image line is identified: it is located at ½T-$F_u$. Let $F_i$ be its frequency and $G_i$ its gain.
- The gain criterion: $G_u - G_i > G_0$ is applied, the gains being expressed in dB.

Two cases then must be envisaged:

- $G_u - G_i > G_0$ is true and then $F_u$ is really the useful signal corresponding to a real echo at an unambiguous distance. $F_i$ then truly corresponds to the image signal to be eliminated.
- $G_u - G_i > G_0$ is false, and it is then $F_u$ that represents the image signal to be eliminated, the signal $F_i$ corresponding to the real echo at an unambiguous distance.

Thus, in the zone without distance ambiguity, the undesirable image echoes can be eliminated in a simple way.

Figure 7A:
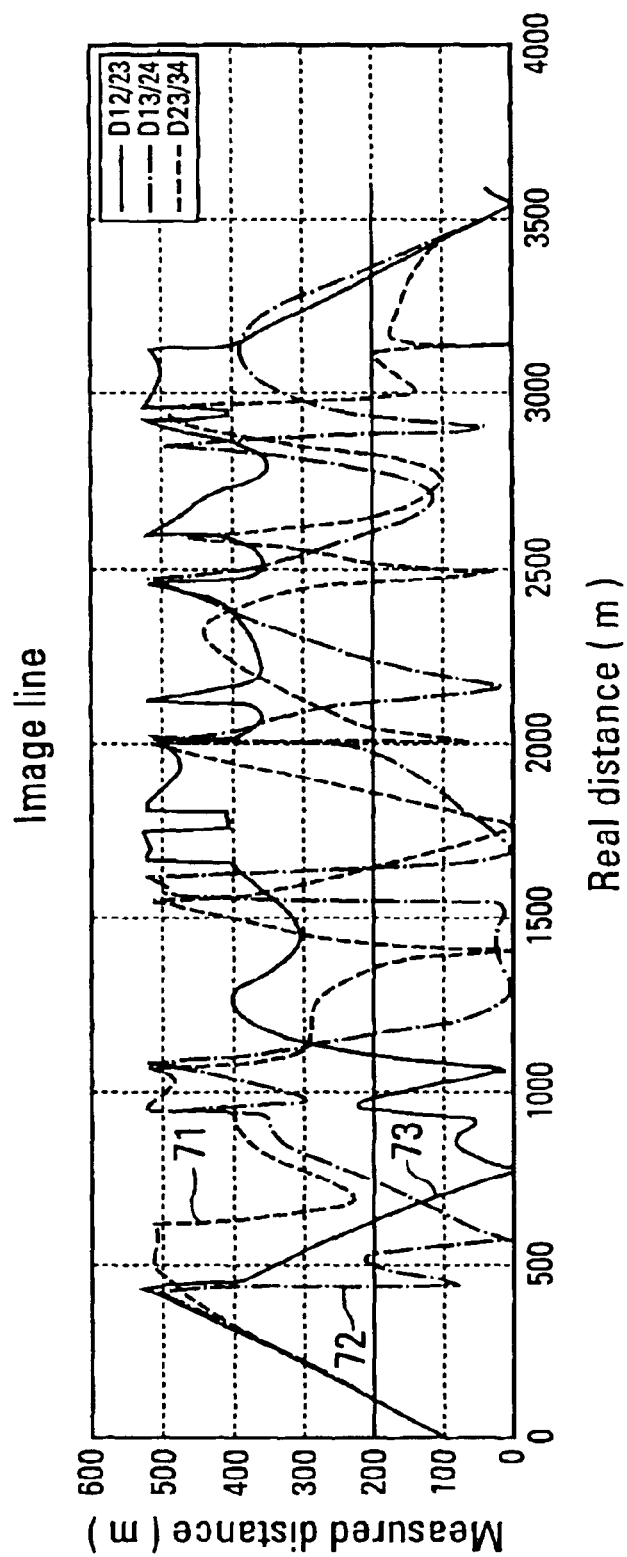
FIG. 7a illustrates an example of a combined application of criteria for the removal of distance ambiguity and for the elimination of the image line.
Figure 7B:
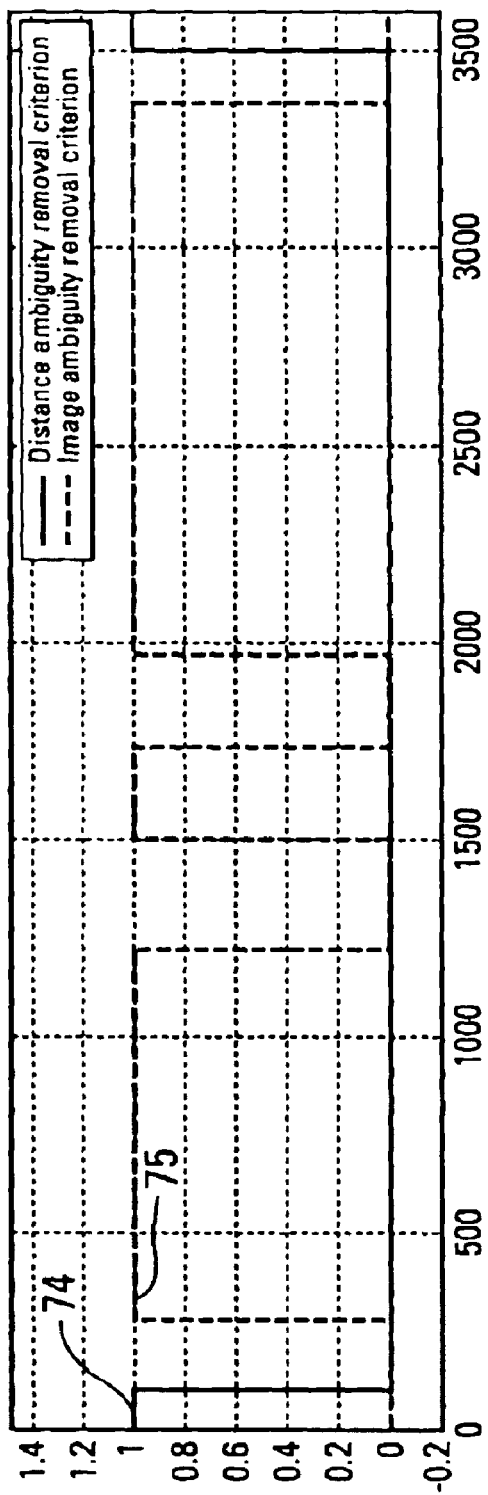
FIG. 7b illustrates a curve corresponding to a validity value given to the signal as a function of distance.

FIG. 7 provides an illustration, through the graphs 7a and 7b, of an exemplary combined application of criteria for the removal of distance ambiguity and for the elimination of the image line. The criteria are applied here to a simulation of the image signal with the following values as in the case of FIG. 5: $D_0$=200 m, $D_1$=30 m and a waveform according to the invention for which Δf'=75 KHz.

The graph 7a, like the graph 5a, represents the curves 71, 72 and 73 of variation of the distance measured by the different usual FSK distance operators D12/23 and D13/24 and D23/34 applied to the image signals, as a function of the real distance of the echo received by the radar. As in the graph 5a, it is noted that, for a distance ranging from 0 m to about 500 m, the three operators give an identical measured distance. Then, beyond 500 m and up to about 3500 m, it is no longer possible to obtain an identity of the three values.

The graph 7b for its part, like the graph 5b, represents the curve 74 corresponding to the validity value given to the unambiguity of the signal present, as a function of the real distance of the echo received, at the measured value. However, it also represents the curve 75 corresponding to the validity value given to the reality of the same signal as a function of the distance.

An examination of the graph 7b the shows that a processing operation that combines the effects of both criteria advantageously makes it possible to determine the signals corresponding to echoes coming from objects located in the zone that is unambiguous in distance. The same processing can therefore be applied also to eliminate the other signals.

The method described in this document can advantageously be applied to FSK radar and especially to radars fitted into automobiles, especially in the field of anti-collision applications.

What is claimed is:

1. A method of increasing the ambiguity distance of an FSK radar, comprising the steps of:

sending out a waveform comprising patterns formed by at least four frequency plateaux, wherein the frequencies of the plateaux forming the patterns are alternately shifted by plus or minus a value Δf' (±Δf') relative to the frequencies of the plateaux of the preceding pattern.

2. The method of claim 1, wherein one in every two patterns is a duration pattern T whose frequency varies from $f_0$ to $f_0+n.\delta f$ in n plateaux.

3. The method of claim 2, wherein the next pattern is one whose frequency varies from ($f_0-\Delta f'$) to ($f_0-\Delta f'$)+n.δf.

4. The method of claim 1, wherein the frequency shift Δf is chosen to be large enough to induce a phase rotation, on the echo of a target located beyond the ambiguity distance.

5. The method of claim 1, wherein the frequency shift is chosen to be low enough not to substantially modify the characteristics of detection of echoes coming from targets that are unambiguous in distance.

6. The method of claim 5, wherein the echoes are not modified in level.

7. The method of claim 1, wherein the ambiguity distance is doubled.

8. The method of claim 4, wherein the frequency shift is chosen to be low enough not to substantially modify the characteristics of detection of echoes coming from targets that are unambiguous in distance.

* * * * *